April 17, 1956 — A. L. KLEIN — 2,742,076
METHOD OF STRETCHING TAPERED SHEETS
Filed Jan. 28, 1952 — 2 Sheets-Sheet 1

INVENTOR.
ARTHUR L. KLEIN
BY
Edwin Coates
-ATTORNEY-

April 17, 1956  A. L. KLEIN  2,742,076
METHOD OF STRETCHING TAPERED SHEETS
Filed Jan. 28, 1952  2 Sheets-Sheet 2

INVENTOR.
ARTHUR L. KLEIN
BY J Edwin Coates
ATTORNEY.

United States Patent Office 2,742,076
Patented Apr. 17, 1956

2,742,076

METHOD OF STRETCHING TAPERED SHEETS

Arthur L. Klein, Los Angeles, Calif., assignor to Douglas Aircraft Company, Inc., Santa Monica, Calif.

Application January 28, 1952, Serial No. 268,523

9 Claims. (Cl. 153—35)

This invention relates to the cold-levelling or stretch-levelling of tapered members such as tapered sheets, plates, extrusions and other structural shapes.

Such operation is usually performed on one tapered member at a time in order primarily to restore the internal cross-sectional stress condition of the material to that pattern which it had before being rolled, forged, extruded or otherwise worked into the structural shape. The latter workings produce an unbalanced or distorted cross-sectional stress pattern so configured that when the forged, extruded or rolled structural shape is allowed to cool without control after forming or is machine-surfaced, it tends to warp under this cross-sectional stress imbalance into shapes so distorted that they cannot be used.

The conventional "stretching" of such tapered members in order to restore the stress pattern to the desired configuration is notoriously unsatisfactory. For one reason, the relatively thin edge of the single tapered member undergoing stretching cannot be held or tensioned in any subsistent manner or by any hitherto known means that will prevent damage to the relatively thin edge of the tapered member. The clamping jaws or the force-field of the stretch-levelling machine quite often break the thin edge, warp it, or otherwise so damage it that the stretched, tapered member is unfit for use. When concurrently stretch-levelling and stretch-contouring, it is sometimes necessary, in order to assure the retention of the contour, to apply forming forces so far exceeding the elastic limit that the thin edge is almost invariably ruptured or deformed so badly as to render the stretched and contoured member unusable.

This invention broadly provides a method of levelling, stretching and contouring tapered members which invariably produces a product in which the cross-sectional stress-pattern is of the optimum shape and configuration thus obviating warping on subsequent machining or other working, yet in which the relatively thin edge or edges remain intact in their original rectilinear, unbroken and unwarped condition. The method incidentally produces a balanced-stress tapered member which, in cooperation with a suitable form, block or the like, may have and retain any desired contour yet will not be stretched beyond its elastic limit. The method also provides a stretch-levelled tapered member free of local surface irregularities, such as "cobbles."

Generically, the present method comprehends the steps of first disposing a pair of tapered members, which may be of triangular, rhomboidal or other shape in cross-section, in mutual facewise contact with the thin-edge portion of the one sheet lying transversely opposite to and complemental to, the thick-edge portion of the other sheet; temporarily uniting the contacting faces to form a temporary billet having a substantially uniform cross-section in planes normal to the direction of stretch; thereafter applying opposite tensile forces to two opposite edges of the billet; continuing the application of these forces until the desired cross-sectional stress pattern is achieved and the members are stretch-levelled; and separating the billet into its two original components.

Each of the stretched members now has a uniform cross-sectional stress-pattern and is of the desired dimensions, thickness, surface condition and contour. It also has at least one relatively thin edge which is at least as rectilinear, unbroken and unwarped as it was initially.

The invention also contemplates certain variants in, and additions to, the generalized method outlined above, one of which variants comprises the substitution for the one of the pair of sheets aforementioned, a "dummy" sheet made of similar material to the remaining sheet and substantially identical in conformation, contour, dimensions, etc., to the sheet for which it is substituted. The method steps outlined above are then proceeded with, whereafter the dummy is removed from its temporary union with the other sheet and may be discarded or used similarly again. Thus, the method may be employed even when there is only one sheet to be worked.

Merely in order to further clarify and exemplify these and other inventive concepts, certain specific methods typifying the invention, and representational means and apparatus for performing the method are shown in the accompanying drawings and described in detail hereinafter in conjunction therewith. It is to be clearly understood, however, that these drawings and descriptions are by no means limitative of the inventive scope, the extent of which is defined in the subjoined claims.

Figure 1:
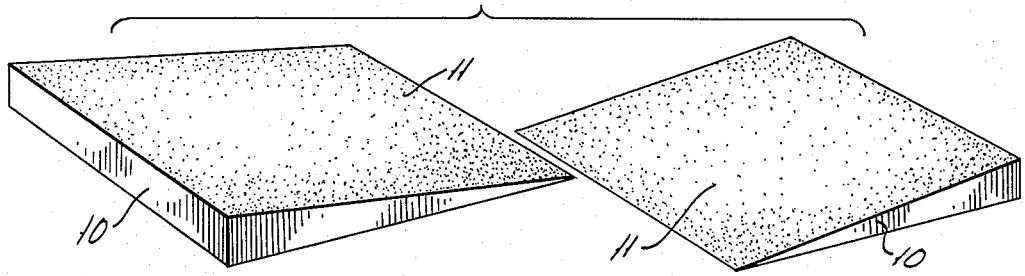
Figure 1 is an expanded perspective view of a pair of tapered triangular section sheets which are to be stretch-levelled as herein, the inner face of each sheet being coated with an adhesive to enable facewise temporary union thereof, as aforementioned.
Figure 2:
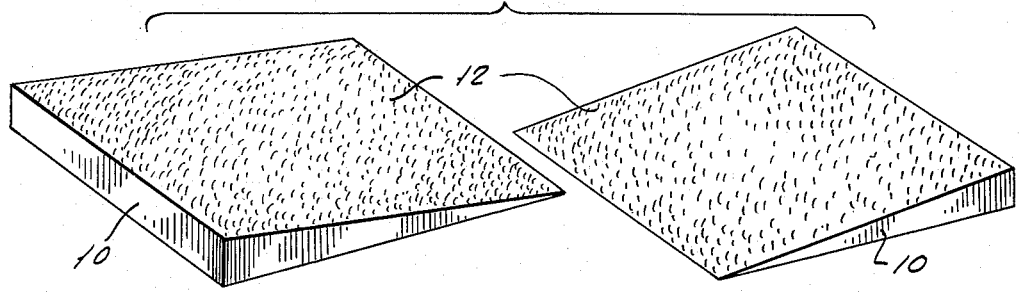
Figure 2 is a similar view of a pair of tapered triangular section sheets, the inner face of each sheet being roughened or provided with burrs or the like to enable facewise temporary union thereof.

Although it will become apparent that the method or this invention is equally applicable to tapered members having the cross-sectional shapes shown in both Figures 1 and 4 and composed of substantially any material that is deformable, for purposes of simplicity the invention will be hereinafter described in conjunction with tapered metal sheets having a scalene triangular section, as shown in Figure 1.

Figure 3:
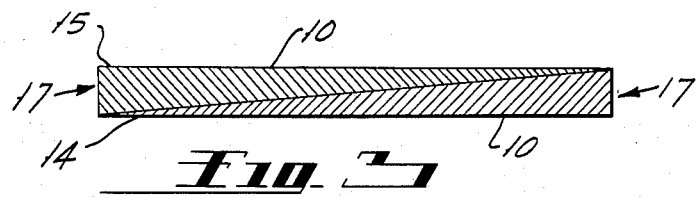
Figure 3 is a longitudinal sectional view of a pair of tapered, triangular section sheets temporarily united facewise for stretch-levelling by the present method.

An even number of these sheets 10, here shown as a pair, are coated on their largest, or inner, faces with a temporary adhesive 11, or provided with interengageable burrs or the like 12, before being placed in the stretch-levelling machine 13. This machine may well be a conventional type of stretch-leveller, diagrammatically illustrated in Figure 5 as including a base 20 and upstanding anchor plates 22 and 23. A first clamp 24 includes a threaded shank 26 passing through the anchor plate 22 and provided with a tightening nut 27, a pair of jaws 28 pivotally connected to the shank at 29 and clamp tightening means 30. A cylinder 32 is secured to plate 23 and encloses a piston, not shown, to which is connected piston rod 33, carrying at its outer end a clamp 34 similar to clamp 24. Pressure may be applied to either side of the piston alternately through conduits 35 and 36 to pull the clamps apart for stretching purposes or to release them. As seen in Figure 3, the thin edge 14 of the lower sheet is disposed under the thick edge 15 of the top sheet at one edge of the billet and vice versa at the opposite edge of the billet. The mated articles thus define a billet in the form of a rectangular parallelopiped, that is, a solid having a rectangular cross-section at least in planes normal to the direction of the stretching tensions. In this manner, the original thin edges are temporarily eliminated and replaced by thick, resistant edges 17. The problem is hence changed from that of clamping and stretching a relatively easily deformable thin edge of a single sheet, which invariably results in damage to this edge, to that of operating only upon the thick edges of a built up body having no edge-portion that is thinner than the other portions of the body, all the edges being of equal thickness, and the cross-sectional area of the body being substantially uniform throughout in planes normal to the direction of stretch.

The edges being all of equal thickness, all are hence equally well adapted to be clamped, and the sheets stretched, without damage thereto. The "thin" edge, and edge-portion of each of these sheets, by virtue of the foregoing arrangements and steps, remains in, or achieves, a rectilinear, or straight condition and is planeal, or smooth in the direction transverse of the sheet, in the direction extending longitudinally of the sheet, and in the direction extending thicknesswise of the sheet, that is, it is planeal or smooth in all three of the spatial-planes or space-directions and space-coordinate axes of solid geometry. These edges are, further, intact and unbroken and are therefore an integral, continuous or uninterrupted entity. Further this edge-portion has all its faces planeal and smooth and its edge is a "right" line, or, is rectilinear. Thus, if the sheets, in their pristine, original condition had a "thin" edge that was in this condition, it will remain in this pristine condition; if this edge was warped broken or "wavy" and irregular, when received for processing, it will be restored to the pristine, original condition it had when first formed and before it was damaged.

Figure 5:
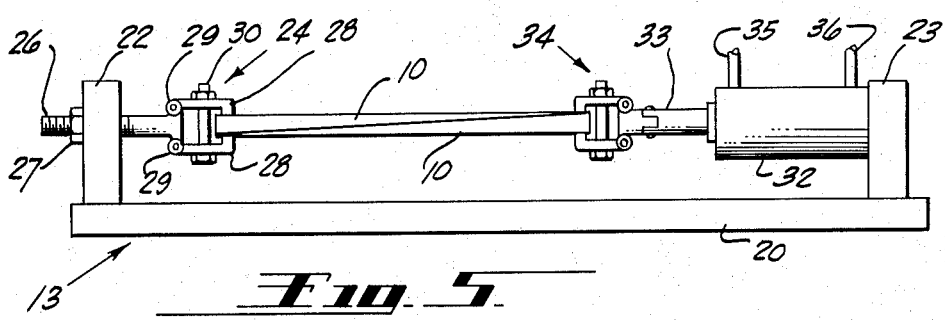
Figure 5 is a longitudinal sectional view in elevation of a diagrammatically illustrated stretch-levelling machine for performing the present invention and containing a pair of triangular section sheets according to Figure 3 mounted therein for stretch-levelling.

Accordingly, as shown in Figure 5, in the next step of the method, the machine is closed and tension is applied equally and oppositely to the equally thick opposite edges 17. For any strain not greatly exceeding the elastic limit, there is no possibility of the thin edge of any sheet being damaged by the metal working forces and small likelihood of its being damaged otherwise, as by clamping forces.

The adhesive by which the largest faces of the tapered sheets are temporarily united facewise as above can be either an age-weakening adhesive, that is, one having a time-disassociation period or one having a tendency to deteriorate with passage of time, such as one of the phenolic resorcinol glues, or a heat weakenable adhesive, such as one of the polyvinyl butyrals or solder. The equal and opposite tensions are applied with sufficient magnitude and for a sufficient time to establish the desired uniform cross-sectional stress pattern and to eliminate the internal imbalance of stresses.

Figure 7:
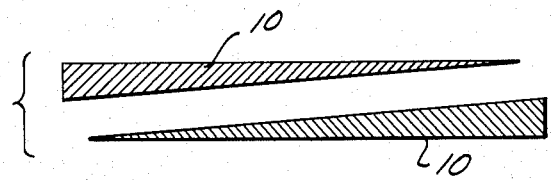
Figure 7 is a longitudinal sectional view of a pair of stretched sheets after separation in the machine of Figure 6.
Figure 8:
Figure 8 is a longitudinal sectional view of a stack of a multiplicity of triangular section tapered sheets with the adjacent faces thereof arranged and united, for treatment according to the present method.

As shown in Figure 7, the edge-portions of the finished product may be elongated and thinned to be even thinner than originally without damage thereto.

After the completion of this step in this machine, the stretched billet is removed from the machine and either allowed to stand until the age-weakening adhesive disassociates sufficiently to be easily shearable, or the billet is heated to a temperature, short of the annealing point of the metal of the billet, adequate to liquefy the heat liquefiable adhesive. Usually, the latter temperature for the butyrals, is of the order of 250° F., insufficient to anneal the common metals and alloys.

Figure 6:
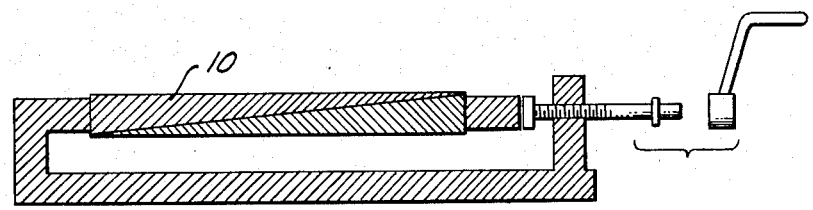
Figure 6 is a longitudinal sectional view of a diagrammatically illustrated "shearing," or separating, machine for a pair of sheets which have been stretch-levelled.

Thereafter, the thus-treated billet is placed in a shear separating apparatus, such as the one representationally shown in Figure 6 and the components of the stretched billet are separated into individual sheets by shear-action along the plane of their union.

For concurrently or independently removing cobbles and other surface-rugosities from tapered sheets, the same procedure is followed, less force being required, of course, than when the aim is to establish a uniform balanced internal stress-field extending in all directions. In this case also, however, there exists no possibility of any thin edges being at all damaged tensilewise and small possibility of other damage occurring. In case compressive damage could occur, however, one of the aforesaid harder "dummy" sheets is employed and it will take these damage-causing forces off the other sheet. The dummy can again be used in the next cycle of operations.

In applying the invention to forming or contouring operations, it is obvious that it is only necessary to employ a stretch forming machine, preferably one with floating jaws such as one of the quite widely used and nationally advertised "Hufford" stretch presses, made and nationally distributed by the Hufford Machine Works, 1700 E. Grand Avenue, El Segundo, California; or a substantially similar such machine as made and nationally distributed by the T. W. and C. B. Sheridan Company, 135 Lafayette Street, New York city. Since the constructional details and mechanism of such machine constitute as such no component of the present invention, which is a method in which such machine may or may not be employed (hand tools being usable), it needs no further mention herein. An operator may then assemble and mount the tapered sheets therein to lie in contact with a form block, generally proceeding thereafter in the manner aforedescribed. The method steps confer upon most of the sheets the desired single or double curved surface conformation or other desired contour, whereafter the sheets may be separated in a suitable shear separating machine and will then be ready for use. Those of the plurality of sheets which do not have the desired radii of curvature may be discarded or used later as the outer sheets.

The sheets may be temporarily united facewise to form the thick edged rectangular section billet by means other than adhesives if desired. For example, burrs rugosities or local protuberances, or the like 12 may be struck up from the largest faces of the sheets and these burrs on the respective faces will be interengaged sufficiently when pressure is applied perpendicularly to the faces to hold the sheets together against displacement in the stretch-levelling or other metal working operations but will permit the sheets to be easily shear separated, as in the aforementioned representational machine.

Figure 4:
Figure 4 is a longitudinal sectional view of a pair of sheets, each of trapezoidal section, temporarily united facewise for stretch-levelling.

As shown in Figure 4, the billet may be formed of trapezoidal section tapered sheets, instead of the aforedescribed triangular section sheets. The method steps are the same in either case.

Although certain ones of the presently contemplated forms and physical expressions of the method and other inventive concepts have been described hereinabove by reference to specific parts and steps, it is to be understood that the invention is not thereby limited to such specific parts or particular steps, but is entitled to, and can, assume any specific form lying within the scope and ambit of the sub-joined claims.

I claim:

1. The method of stretch-levelling at least one member tapered in section in the direction of stretch while avoiding mutilation of any edge-portion thereof, comprising: disposing a pair of such sectionally tapered members in facewise contact and in oppositely directed attitudes with the relatively thin edge-portion of the one member lying longitudinally adjacent the opposite, relatively thick edge-portion of the other member and temporarily forming thereof a geometrical solid of substantially uniform cross-section throughout in planes normal to the direction of stretch; oppositely tensioning two opposite edges of said solid sufficiently to establish a desired cross-sectional stress-pattern in at least one of said members; and thereafter separating the solid into individually stretch-levelled sectionally tapered members in at least one of which the relatively thin portion is intact integral and rectilinear and planeal in all three space-planes.

2. The method of stretch-levelling at least one member tapered in section in the direction of stretch while avoiding mutilation of any edge-portion thereof, comprising: providing the corresponding largest faces of a pair of such sectionally tapered members with a temporary member-uniting means; disposing a pair of such sectionally tapered members in facewise mutual contact and in oppositely directed attitudes with the relatively thin edge-portion of the one member lying longitudinally adjacent the opposite, relatively thick edge-portion of the other member and temporarily forming thereof a unitary geometrical solid of substantially uniform cross-section throughout in planes normal to the direction of stretch; oppositely tensioning two opposite edges of said solid sufficiently to establish a uniform cross-sectional stress-pattern in said members; and thereafter shear separating the solid into individually stretch-levelled sectionally tapered members in at least one of which the relatively thin portion is intact, integral and planeal in all three space-directions.

3. The method of stretch-levelling at least one member tapered in section in the direction of stretch while avoiding mutilation of any edge-portion thereof, comprising: providing the largest face of each of an even number of sectionally tapered members, including a dummy tapered member, with means for temporarily uniting said members; disposing such members in facewise mutual contact and in oppositely directed attitudes with the relatively thin edge-portion of the one member lying longitudinally adjacent the opposite, relatively thick edge-portion of the other member and temporarily forming thereof a unitary geometrical solid of substantially uniform cross-section throughout in planes normal to the direction of stretch; oppositely tensioning the solid equally sufficiently to establish a uniform cross-sectional stress pattern in said members while causing the dummy to absorb unbalanced stretch-levelling forces; shear-separating the solid formed of the temporarily united members into individual sectionally tapered members in one of which the relatively thin marginal portion has planeal opposite major faces and its edge-line is rectilinear; and retaining the dummy for use in subsequent stretch-levelling operations with similar tapered members to similarly prevent mutilation of the relatively thin portions of said sectionally tapered members.

4. The method of stretch-levelling at least one of a plurality of substantially triangular-section tapered members while avoiding mutilation of any edge-portion thereof, comprising: disposing an even number of triangular section tapered members with their largest faces in mutual contact and in oppositely directed attitudes with the portion of the one member that is thin relatively to the other portions of said member lying longitudinally adjacent the opposite relatively thick portion of the other member and temporarily forming a billet thereof; tensioning the billet equally in two opposite directions sufficiently to simultaneously establish a uniform cross-sectional stress pattern in each of said members; and shear-separating the billet into individually stretch-levelled tapered members in each of which the relatively thin portion is intact.

5. The method of stretch-levelling at least one of a plurality of deformable, tapered section articles, comprising: providing one of the larger faces of each of a plurality of tapered section articles with a temporary adhesive for temporarily uniting the articles into a billet; disposing the so-treated faces in mutual contact and temporarily uniting the articles to form a billet of substantially uniform cross-section throughout in planes normal to the direction of stretch; applying to two opposite edges of the billet and in a plane extending substantially longitudinally centrally thereof, equal and oppositely directed tensile forces sufficiently to establish a uniform cross-sectional stress-pattern in at least one of said articles; and applying to two opposite sides of said billet, equal and oppositely inwardly directed compressive forces so as to separate the temporarily unitary billet into individually stretch-levelled tapered section articles in each of which the relatively thin portion is substantially in its pristine condition.

6. The method of stretch-levelling at least one of a plurality of deformable, sectionally tapered articles, comprising: providing one of the larger faces of each of a plurality of sectionally tapered articles with a phenolic resorcinol glue for temporarily uniting the articles into a billet; disposing the so-treated faces in mutual contact and temporarily uniting the articles to form a billet of substantially uniform cross-section throughout in planes normal to the direction of stretch; applying to two opposite edges of the billet and in a plane extending substantially longitudinally centrally thereof, equal and oppositely directed tensile forces sufficiently to establish a uniform cross-sectional stress-pattern in at least one of said articles; allowing the so-treated billet to stand for at least the time-disassociation period of said glue; and applying to two opposite sides of said billet, equal and oppositely inwardly directed compressive forces so as to separate the temporarily unitary billet into individually stretch-levelled sectionally tapered articles in each of which the relatively thin portion is substantially in its pristine condition.

7. The method of stretch-levelling at least one of a plurality of cold-deformable, tapered section articles, comprising: providing one of the larger faces of each of a plurality of tapered section articles with a polyvinyl butyral adhesive for temporarily uniting the articles into a billet; disposing the so-treated faces in mutual contact and temporarily uniting the articles to form a billet of substantially uniform cross-section throughout in planes normal to the direction of stretch; applying to two opposite edges of the billet and in a plane extending substantially longitudinally centrally thereof, equal and oppositely directed tensile forces sufficiently to establish a uniform cross-sectional stress-pattern in said articles; heating the billet to a temperature of the order of 250° F.; and applying to two opposite sides of said billet, equal and oppositely inwardly directed compressive forces so as to separate the temporarily unitary billet into individually stretch-levelled tapered section articles in each of which the relatively thin portion is substantially in its pristine condition.

8. The method of stretch-levelling at least one of a plurality of deformable, sectionally tapered articles, comprising: providing one of the larger faces of each of a plurality of sectionally tapered articles with a heat softenable adhesive for temporarily uniting the articles into a billet; disposing the so-treated faces in mutual contact and temporarily uniting the articles to form a billet of substantially uniform cross-section throughout in planes normal to the direction of stretch; applying to two opposite edges of the billet and in a plane extending substantially longitudinally centrally thereof, equal and oppositely directed tensile forces sufficiently to establish a uniform cross-sectional stress-pattern in said articles; heating the billet to the softening temperature of the adhesive; and applying to two opposite sides of said billet, equal and oppositely inwardly directed compressive forces so as to separate the temporarily unitary billet into individually stretch-levelled sectionally tapered articles in each of which the relatively thin portion is substantially in its pristine condition.

9. The method of stretch-levelling at least one member tapered in section in the direction of stretch while avoiding mutilation of any edge portion thereof, comprising: providing a section taper-forming face of each of a plurality of sectionally tapered members with a plurality of facewise engageable burrs or local protuberances; disposing the burred faces of the tapered section members in mutual facewise contact and interengaging the burrs to temporarily unite the members into the form of a billet of substantially uniform cross-section throughout in planes normal to the direction of stretch; oppositely tensioning two opposite edges of said billet sufficiently to establish a desired cross-sectional stress-pattern simultaneously in all said members; and thereafter separating the billet into individually stretch-levelled tapered section members in at least one of which the relatively thin portion is at least as intact as the said portion was initially.

References Cited in the file of this patent

UNITED STATES PATENTS

| | | |
|---|---|---|
| 312,608 | Britton | Feb. 24, 1885 |
| 395,488 | Dale | Jan. 1, 1889 |
| 1,748,603 | Heacock et al. | Feb. 25, 1930 |
| 1,823,102 | Homey | Sept. 15, 1931 |
| 1,920,854 | Gathmann | Aug. 1, 1933 |
| 2,046,504 | Cooper | July 7, 1936 |
| 2,086,135 | McIlvane | July 6, 1937 |
| 2,144,915 | Derby | Jan. 24, 1939 |
| 2,179,530 | Townsend | Nov. 14, 1939 |
| 2,218,503 | Brooks et al. | Oct. 22, 1940 |
| 2,326,470 | Lermont | Aug. 10, 1943 |
| 2,356,433 | Roesch | Aug. 22, 1944 |
| 2,593,460 | Johnson | Apr. 22, 1952 |

FOREIGN PATENTS

| | | |
|---|---|---|
| 16,200 | Great Britain | July 21, 1904 |
| 502,757 | France | Feb. 27, 1920 |